United States Patent [19]

Tanigawa et al.

[11] Patent Number: 4,877,071

[45] Date of Patent: Oct. 31, 1989

[54] THREE LAYER CUSHION TIRE

[75] Inventors: Motoshi Tanigawa, Himeji; Hidehiko Dohi, Takasago; Takashi Nishimura, Kobe; Kouji Ichikawa, Nishinomiya; Tetsuo Koishi, Kobe, all of Japan

[73] Assignee: Sumitomo Rubber Industries, Ltd., Hyogo, Japan

[21] Appl. No.: 164,218

[22] Filed: Mar. 4, 1988

[30] Foreign Application Priority Data

Mar. 6, 1987 [JP] Japan ................... 62-52595

[51] Int. Cl.$^4$ .............................................. B60C 5/00
[52] U.S. Cl. ..................................... 152/165; 152/155; 152/157; 152/302; 152/322; 152/327
[58] Field of Search ............... 152/155, 157, 158, 301, 152/302, 303, 343.1, 344.1, 345.1, 515, 306, 320, 322, 165, 325, 327

[56] References Cited

U.S. PATENT DOCUMENTS

| 678,340 | 7/1901 | Holland | 152/302 |
|---|---|---|---|
| 1,276,148 | 8/1918 | Williams | 152/302 |
| 3,095,917 | 7/1963 | Arsandaux | 152/155 |
| 3,205,928 | 9/1965 | Fishman | 152/155 |
| 4,573,510 | 3/1986 | Ippen et al. | 152/302 X |

Primary Examiner—Michael W. Ball
Assistant Examiner—Jeff H. Aftergut
Attorney, Agent, or Firm—Birch, Stewart, Kolasch & Birch

[57] ABSTRACT

A cushion tire especially intended for industrial or construction vehicles such as a forklift truck wherein the cushion tire has a triple layered structure comprising a base rubber layer, a middle rubber layer and a tread rubber layer arranged radially outwardly in that order, and the middle rubber layer is provided with a hollow part extending circumferentially of the tire, whereby the ride is softened while durability and driving stability are maintained at a good level.

7 Claims, 2 Drawing Sheets

THREE LAYER CUSHION TIRE

BACKGROUND OF THE INVENTION

The present invention relates to a cushion tire, especially intended for industrial or construction vehicles such as a forklift truck, in which the ride is softened while durability and driving stability are maintained.

In general, heavy duty tires for industrial vehicles such as forklift truck tires require anti-abrasion and anti-cut charcteristics because they are used at comparatively low speed but with heavy load on a road on which nails, stones, wood splinters and the like lie.

Therefore, for such uses there has been used a solid tire of a two-layered construction, in which a tread rubber layer with anti-abrasion and high anti-cut characteristic is used as a radially outer part of the tire to provide a durable treading surface, and a base rubber layer with high modulus of compression elasticity is used as an inner part of the tire to increase the pressure of insertion into the rim, whereby each layer contributes at least partially to the required characteristics.

Recently, in view of the drivers' health care, such tires also require a soft ride, and accordingly, as shown in FIG. 3, there is proposed a solid tire of a triple-layered structure, in which a soft rubber layer C with a high cushion quality is disposed between the base rubber layer A and the tread rubber layer B.

Such triple-layered tire, however, involves the following problems: as an inevitable consequence of the modern tendency of providing low profile tire, the intermediate soft rubber layer C has become thinner thereby reducing its cushion effect. If the soft rubber layer is made thicker, then the volume of the base rubber layer must become smaller thereby decreasing the rigidity thereof. If the pressure of insertion between the tire and the rim is reduced as rim slipping may occur. Also, the soft rubber layer not only improves the ride comfort but also reduces driving stability and durability.

It is therefore, an object of the present invention to provide a cushion tire, which is improved in ride comfort while maintaining anti-abrasion and anti-cut characteristics, driving stability and the pressure of insertion to the rim at the same level as that of former two-layered solid tires.

SUMMARY OF THE INVENTION

According to one aspect of the present invention, the cushion tire has a tripple layered structure comprising a base rubber layer, a middle rubber layer and a tread rubber layer arranged radially outwardly in that order, and the middle rubber layer is provided with a hollow part extending circumferentially of the tire.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Embodiments of the present invention will now be described, by way of example only, in conjunction with the accompanying drawings.

Figure 1:
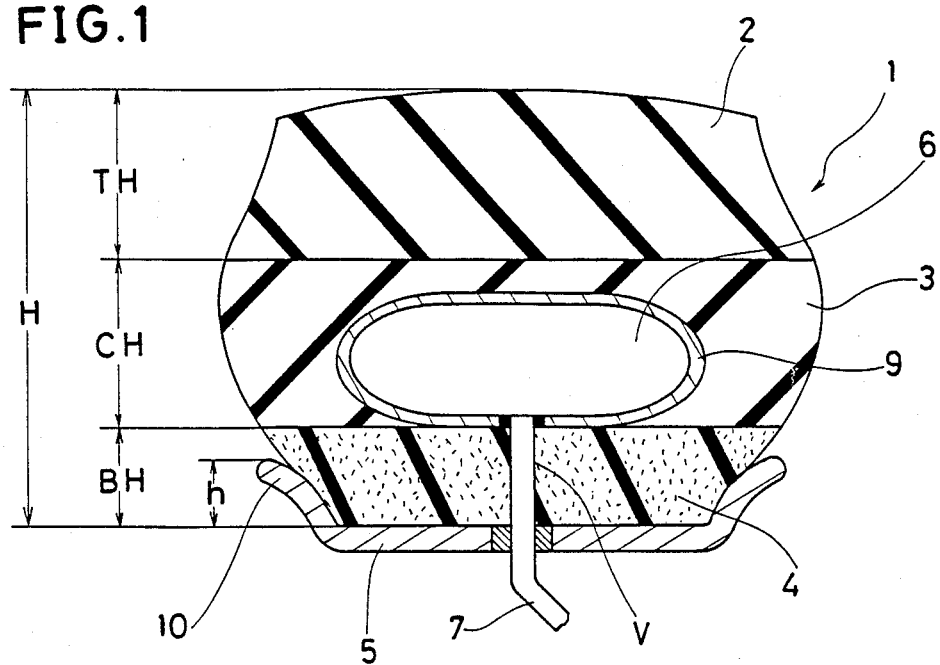
FIG. 1 is a cross sectional view of one embodiment of the present invention.

In FIG. 1 showing a tire of the present invention which is provided with an air valve 7, the cushion tire 1 has a triple layered structure comprising a base rubber layer 4, a middle rubber layer 3 and a tread rubber layer 2 arranged radially outwardly in that order, and the middle rubber layer 3 is provided with a hollow part 6 extending circumferentially of the tire.

The base rubber layer 4 is composed of a hard rubber compound reinforced by reinforcing materials. In this example, JIS A hardness of the hard rubber compound is more than 75°, and the reinforcing materials are chopped fiber cords of less than 60 mm length which are formed by chopping organic or inorganic fiber cords used in a conventional tire carcass cord. The chopped fiber cords are added to the hard rubber compound by less than 50% in an amount of weight. Therefore, the pressure of insertion between the tire and a wheel rim 5 is increased, and as the result the tire life becomes longer. By the way, other than the chopped fiber cords other kinds of reinforcing materials such as a conventional bead wire, can be used to increase its rigidity and its compression elasticity.

Moreover, the sectional height BH of the base rubber layer 4 is set larger than the height h of the rim flange 10 and within the range of 15 to 40% of the tire section height H.

The middle rubber layer 3 is composed of a soft rubber compound having a JIS A hardness of 45° to 60° and an impact resilience of more than 50%. As an example of such a rubber compound, there is preferably used one in which 30 to 60 PHR of soft carbon black are mixed into so-called high elasticity rubber such as natural rubber, butadiene rubber, etc.

The thickness CH of the middle rubber layer 3 is in the range of 20 to 50% of the tire section height H.

The tread rubber layer 2 is preferably composed of a rubber compound having a JIS A hardness of 60° to 75° and having a good resistance to wear and cut. If the JIS A hardness is less than 60°, then the cut resistance and wear resistance decrease. On the other hand, if it is more than 75°, then the grip performance decreases.

Moreover, the thickness TH of the tread rubber layer 2 is in a range of 20 to 40% of the tire sectional height.

A circular tube 9 is embedded in the middle rubber layer 3, whereby the middle rubber layer 3 is provided with a circular hollow part 6 defined as the interior of the tube 9 and extending circumferentially of the tire. The circular tube 9 comprises a rubber tube or a plastic tube having less air permeability and more preferably reinforced with an organic fiber cord ply such as nylon, polyester fiber cords and the like. By using such circular tube 9, air leakage is prevented even when the tire is under repeated deformation and is filled with air to a high inner pressure.

Preferably the volume V6 of the circular hollow part 6 is in the range of 30 to 60% of an apparent volume V3 of the middle rubber layer 3, wherein the apparent volume V3 means a whole volume of the middle rubber layer (including the hollow part) between the tread rubber layer and the base rubber layer. If the volume V6 is more than 60%, then the tire becomes too soft, and it deforms so much as to suffer cracks, and thus further maneuverability is decreased. On the other hand, if the volume V6 is less than 30%, then the cushioning capacity is not given to the tire, and accordingly the improvement in ride comfort is not expected.

The above mentioned circular hollow part 6 is inflated to a high pressure of 1 to 10 kg/cm².

In this embodiment, the hollow part is provided with an air valve 7, which extends through the base rubber layer 4 and a wheel rim 5 to the outside of the tire, and through this air value 7 the hollow part is filled with air to the above mentioned high pressure.

The method for producing the cushion tire of FIG. 1, comprises the steps of:

attaching the air valve 7 to the circular tube 9, placing the base rubber layer 4 on a forming drum which is provided with a recess for the air valve 7;

a valve hole V in the base rubber layer on the making former;

placing the middle rubber layer 3 and the tube 9 on the base rubber layer 4 on the forming drum;

placing the tread rubber layer 2 on the middle rubber layer; and vulcanizing the above mentioned layers to unite them into one body.

Figure 2:
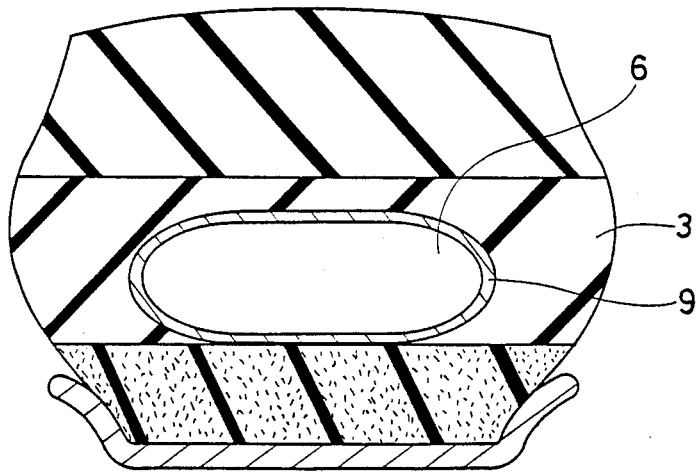
FIG. 2 is a cross sectional view of another embodiment of the present invention.

FIG. 2 shows another embodiment of the present invention, wherein the above mentioned air valve 7 is omitted.

In this case, the inflation of the hollow part 6 is achieved by chemicals which are enclosed therein prior to vulcanization. The chemicals irreversibly react at a temperature of the vulcanization (100° to 150° C.), and produce gas, whereby the hollow part 6 is inflated with the gas to the certain pressure. Such chemicals, as $NH_4Cl + NaNO_2$ which react to produce nitrogen gas can be used.

Working Example

As a working example of the present invention, test tires of size 7.00-12 which have the sectional construction shown in FIG. 2, are made according to the specifications set forth in table 1.

Figure 3:
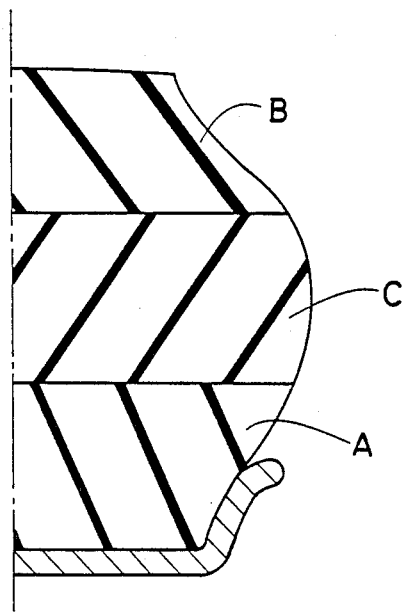
FIG. 3 is a cross sectional view of an example according to the prior art.

Moreover, as a comparative example, prior art tires of FIG. 3 are made using the same rubber compound as in the working example.

The test tires and prior art tires are evaluated for their ride comfort in an actual running test conducted by five test drives. The obtained results are shown in Table 1, wherein the results are represented by an index value of their mean value by the five point method. The larger the value, the superior the ride comfort.

TABLE 1

| Construction | Embodiment FIG. 2 | Comparative Ex. FIG. 3 |
| --- | --- | --- |
| Tread rubber layer | | |
| TH/H | 30% | 30% |
| JIS Hardness | 65° | 65° |
| Middle rubber layer | | |
| CH/H | 35% | 35% |
| JIS Hardness | 48° | 48° |
| Base rubber layer | | |
| BH/H | 35% | 35% |
| JIS Hardness | 80° | 80° |
| Fiber cords | Nylon 1260 d | Nylon 1260 d |
| Length | 50 mm | 50 mm |
| Weight % | 40% | 40% |
| Hollow part | | |
| VA/VA | 50% | 0 |
| Ride Comfort | 100 | 85 |

As apparent from Table 1, the working example of the invention is remarkably improved in the ride comfort due to the superior cushioning performance in comparison with the comparative example.

Incidentally, the method for producing the working example comprises the steps of:

enclosing the above mentioned chemicals in a circular tube 9 which is made of polystyrene;

covering the outside of the tube 9 with a canvas composed of nylon fiber cords embedded in halogenated butyl rubber;

placing the base rubber layer 4 on a drum forming device;

placing the middle rubber layer 3 and the reinforced tube 9 on the base rubber layer 4 on forming device;

placing the tread rubber layer 2 on the middle rubber layer and vulcanizing the above mentioned layers to unite them into one body.

As described above, the cushion tire has the triple layered structure based on the conventional solid tire, and the middle rubber layer is provided with a circular hollow part inflated to a predetermined pressure. Such a construction provides a suppleness which could not be expected from the conventional solid tire. Therefore the ride comfort is improved, while the required general characteristics such as endurance durability, driving stability, resistance to cut and the like are maintained.

We claim:

1. A cushion tire having a triple layered structure comprising a base layer of hard rubber, a middle layer of soft rubber and a tread layer of rubber arranged in that order in a radially outward sequence from the base layer to the tread layer, the section height of said base layer being in the range of 15 to 40% of the tire section height, the section height of said middle layer being in the range of 20 to 50% of the tire section height, the section height of said tread layer being in the range of 20 to 40% of the tire section height, the hardness of the base layer being more than 75 JIS-A, the hardness of the middle layer being in the range of 45 to 60 JIS-A and the impact resilience of the middle layer being more than 50%, the hardness of the tread layer being in the range of 60 to 75 JIS-A, said middle layer being provided with a circumferentially extending circular hollow part, and the volume of said circular hollow part being in the range of 30 to 60% of the whole volume of the middle layer.

2. The cushion tire of claim 1, wherein said base layer is reinforced with fiber cords having lengths of less than 60 mm.

3. The cushion tire of claim 2, wherein the circular hollow part of the middle layer is a circular tube embedded therein, said circular tube being reinforced with fiber cords.

4. The cushion tire of claim 1, wherein said circular hollow part is provided with an air valve extending from the hollow part to the outside of the tire through the base layer.

5. The cushion tire of claim 1, wherein said circular hollow part has an inflated pressure of 1 to 10 kg/sq.cm.

6. The cushion tire of claim 5, wherein the inflated pressure is produced by the presence of chemicals in the circular hollow part which upon vulcanization react to form a gas.

7. The cushion tire of claim 6, wherein the chemicals are $NH_4Cl$ and $NaNO_2$ which react to produce nitrogen gas.

* * * * *